(12) United States Patent
Schmidt et al.

(10) Patent No.: US 8,771,518 B2
(45) Date of Patent: Jul. 8, 2014

(54) METHOD FOR FILTERING CARRIER OIL

(75) Inventors: Wayne J Schmidt, Boise, ID (US); John A Thompson, Boise, ID (US); John H Stewart, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 13/190,177

(22) Filed: Jul. 25, 2011

(65) Prior Publication Data
US 2013/0026101 A1   Jan. 31, 2013

(51) Int. Cl.
*B01D 15/00* (2006.01)
(52) U.S. Cl.
CPC ..................... *B01D 15/00* (2013.01)
USPC .......................................... 210/660

(58) Field of Classification Search
CPC ......... B01D 15/00; B01D 15/14; G03G 21/10
USPC ............................................. 210/660; 399/358
See application file for complete search history.

(56) References Cited

U.S. PATENT DOCUMENTS

| | | | | |
|---|---|---|---|---|
| 3,544,458 | A | * | 12/1970 | Sato .............................. 204/562 |
| 5,403,489 | A | * | 4/1995 | Hagen et al. ................... 210/638 |
| 5,439,593 | A | * | 8/1995 | Price ............................... 210/660 |
| 2009/0175665 | A1 | * | 7/2009 | Wilde et al. .................... 399/348 |

* cited by examiner

*Primary Examiner* — Matthew O Savage

(57) ABSTRACT

Fluid filtration systems and methods thereof to filter fluid in a first directional mode and a second directional mode are disclosed. Fluid filtration systems and methods thereof include a first directional mode, a second directional mode, and a filter unit. The filter unit includes a filter housing unit and a filter chamber disposed in the filter unit.

2 Claims, 14 Drawing Sheets

METHOD FOR FILTERING CARRIER OIL

BACKGROUND

Fluid filtration systems may remove unwanted materials from fluids by passing the fluids through filtration media. Fluid filtration systems may be used in image forming apparatuses such as liquid electrophotography printing apparatuses, for example, to filter carrier oil to be reused therein. Carrier oil may be used in liquid toner to carry pigmented particles to be applied to media to form images thereon.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Fluid filtration systems may remove unwanted materials from fluids by passing the fluids through filtration media. For example, fluid filtration systems may be used in image forming apparatuses such as liquid electrophotography printing apparatuses to filter carrier oil to be reused. The filtration media, for example, may include porous adsorbent material to remove unwanted materials from the fluid. The porous adsorbent material may be in a form of a bed of porous adsorbent crystals. The flow of the fluid may form a constant flow pattern including the same flow routes through the porous adsorbent material such as parallel flow paths in a same direction through the porous adsorbent material. The constant flow pattern in the same direction may utilize the same portion of the filtration media and may reduce the effectiveness of the filtration media to filter the fluid. Thus, a rate and capacity of the filtration media to remove unwanted trace materials from the fluid may decrease.

In some examples, fluid filtration systems include, among other things, a filter unit including a fluid transport unit and a filter housing unit having a filter chamber to store filtration media therein. The fluid transport unit may selectively direct the fluid such as carrier oil to establish a first flow pattern in at least a first direction through the filtration media in the first directional mode and selectively direct the carrier oil to establish a second flow pattern in at least a second direction through the filtration media in the second directional mode. The at least first direction is different than the at least second direction. Consequently, selectively changing directional flow of the carrier oil through the filtration media reduces establishment of constant flow patterns of the carrier oil through the filtration media and utilizes more of the filtration material. Thus, the rate and capacity of the filtration material to remove unwanted trace materials such as ink additives from the carrier oil may be increased. Accordingly, an amount of filtration media to be used, a size of the filter unit and a number of times the filter unit may need to be replaced are reduced.

Figure 1:
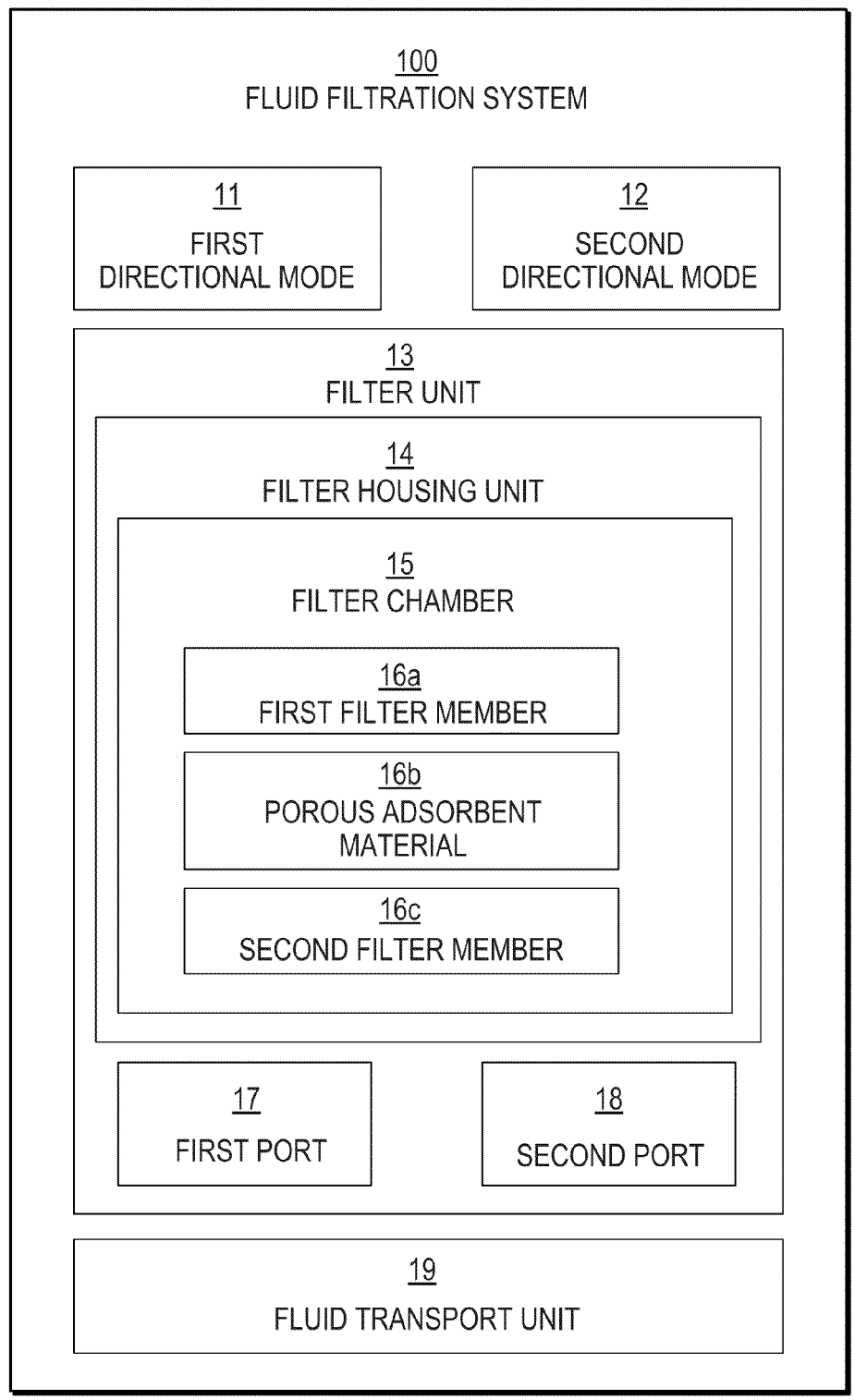
FIG. 1 is a block diagram illustrating a fluid filtration system according to an example.
Figure 2A:
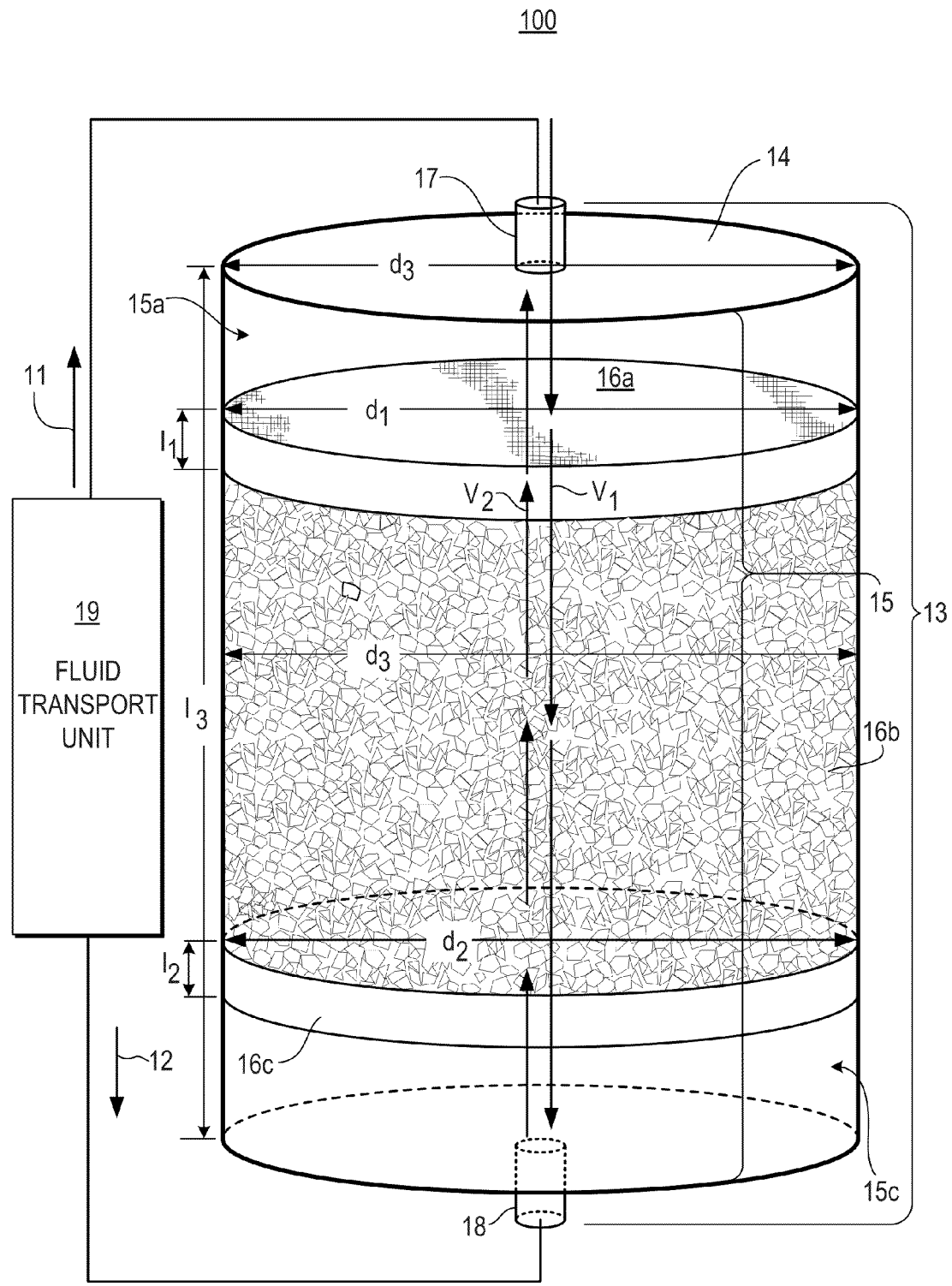
FIG. 2A is a schematic view illustrating the fluid filtration system of FIG. 1 according to an example.
Figure 2B:
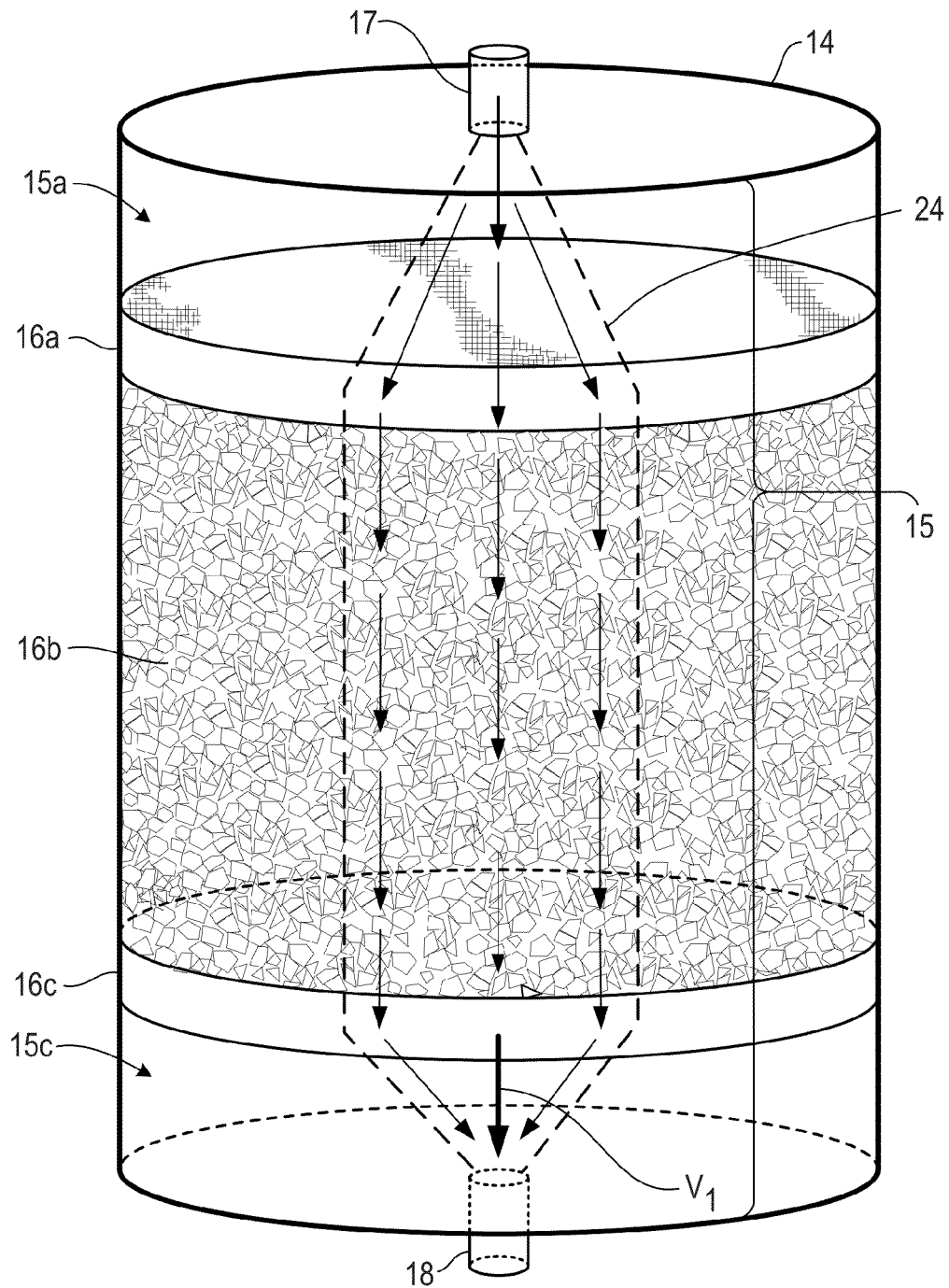
FIGS. 2B and 2C are exploded views of a filter unit of the fluid filtration system of FIG. 2A illustrating a first flow pattern and a second flow pattern, respectively, according to examples.
Figure 2C:
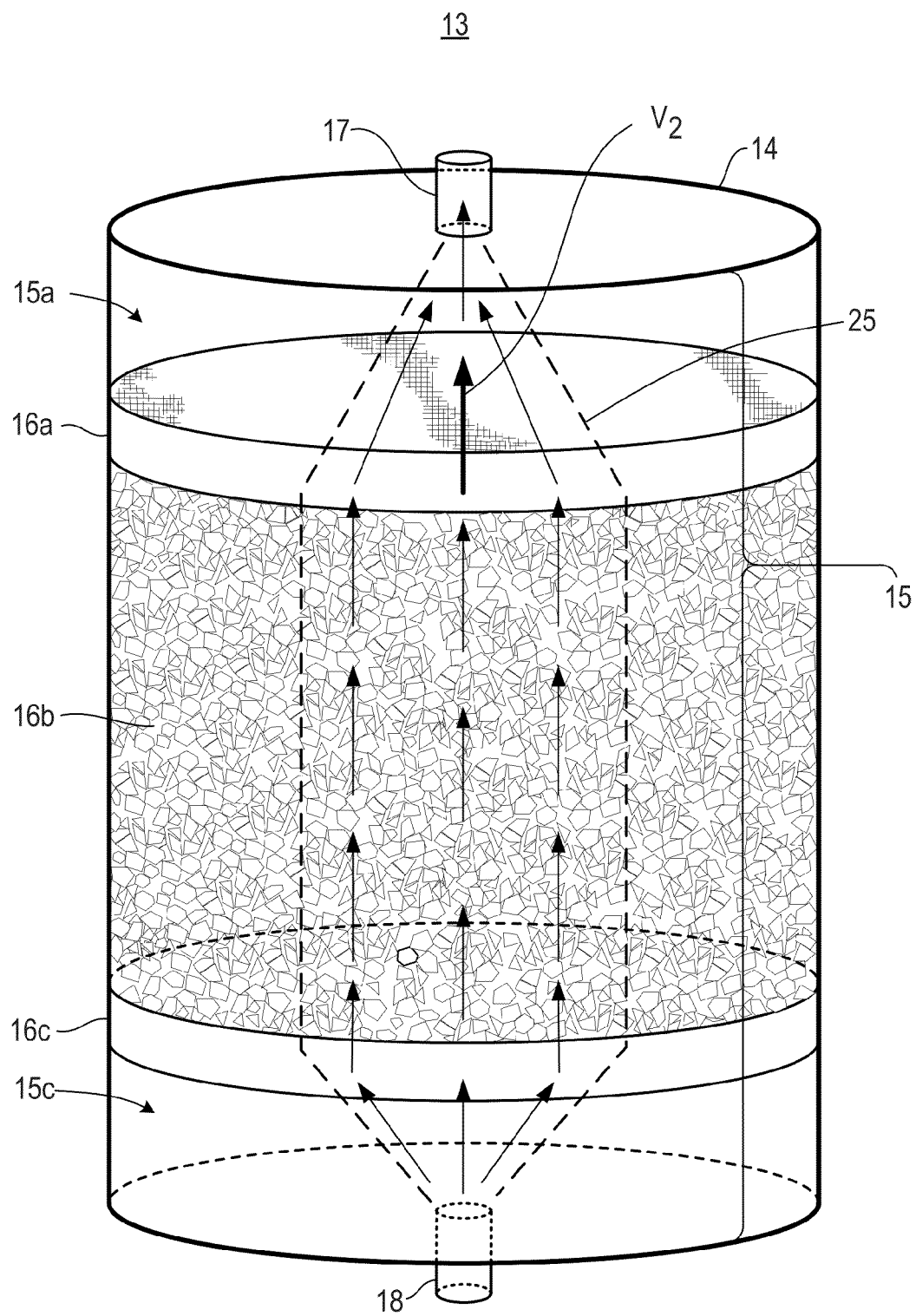

FIG. 1 is a block diagram illustrating a fluid filtration system according to an example. FIG. 2A is a schematic view illustrating the fluid filtration system of FIG. 1 according to an example. FIGS. 2B and 2C are exploded views of a filter housing unit of the fluid filtration system of FIG. 2A illustrating a first flow pattern and a second flow pattern, respectively, according to examples. Referring to FIGS. 1-2C, in some examples, a fluid filtration system 100 having a first directional mode 11 and a second directional mode 12 includes a filter unit 13 and a fluid transport unit 19. The filter unit 13 includes a filter housing unit 14 and a filter chamber 15 disposed in the filter housing unit 14. The filter chamber 15 includes filtration media stored in the filter chamber 15 to filter fluid transported therethrough in a first flow pattern 24 in at least a first direction $V_1$ in the first directional mode 11 and a second flow pattern 25 in at least a second direction $V_2$ in the second directional mode 12. The filter unit 13 also includes a first port 17 and a second port 18 in fluid communication with the filter chamber 15. In the first directional mode 11, the first port 17 receives the fluid and the second port 18 outputs the fluid. In the second directional mode 12, the second port 18 receives the fluid and the first port 17 outputs the fluid.

Referring to FIGS. 1-2C, in some examples, the filtration media includes a first filter member 16a, a second filter member 16c, and porous adsorbent material 16b disposed between the first filter member 16a and the second filter member 16c.

In some examples, the second filter member 16c receives the fluid after the first filter member 16a receives the fluid in the first directional mode $1_1$, and the second filter member 16c receives the fluid before the first filter member 16a receives the fluid in the second directional mode 12.

The first filter member 16a and the second filter member 16c, for example, may be in a form of mesh screens to confine the porous adsorbent material 16b therebetween and allow the fluid to pass through the first filter member 16a and the second filter member 16c. Thus, the porous adsorbent material 16b may be confined in the flow path of the fluid. The first and second filter members 16a and 16c filter members 16a and 16c may include a cellulose filter paper, a plastic based filter material, and the like, depending on its chemical compatibility with the fluid being filtered and the porosity required to retain the adsorbent filter material 16b. The porous adsorbent material 16b, for example, may be in a form of a bed of porous adsorbent crystals such as Silica gel, charcoal or Carbon depending of the type of contaminate to be adsorbed and the rate of adsorption required. In some examples, the crystals may include various shapes and sizes. In some examples, the fluid may be carrier oil, for example, to be used in a liquid toner such as ElectroInk, trademarked by Hewlett-Packard Company. The carrier oil, for example, may be an imaging oil such as Isopar, trademarked by Exxon Corporation. The filter chamber 15 may also include a first pressure equalization region 15a disposed between the first filter member 16a and the first port 17 and a second pressure equalization region 15c disposed between the second filter member 16c and the second port 18 to equalize pressure therein to evenly disperse fluid through the porous adsorbent material 16b.

In operation, in the first directional mode 11, fluid is transported by the fluid transport unit 19 to the first port 17 of the filter housing unit 14 to establish the first flow pattern 24 in at least a first direction $V_1$ through the filtration media in the fluid chamber 15. That is, the fluid sequentially passes through the first port 17, the first filter member 16a, the porous absorbent material 16b, the second filter member 16c, and exits out the second port 18. In the second directional mode 12, fluid is transported by the fluid transport unit 19 to the second port 18 of the filter housing unit 14 to establish the second flow pattern 25 in at least the second direction $V_2$ through the filtration media in the fluid chamber 15. That is, the fluid sequentially passes through the second port 18, the second filter member 16c, the porous absorbent material 16b, the first filter member 16a, and exits out the first port 18. Alternating between the first directional mode 11 and the second directional mode 12 to change the respective direction $V_1$ and $V_2$ of the flow of the fluid in the filtration media such as the porous adsorbent material 16b may maintain a rate and capacity of the filtration media to filter the fluid passing therethrough.

Referring to FIG. 2A, in some examples, the first filter member 16a may be in a shape of a first cylinder having a first diameter $d_1$ and a first cylinder length $l_1$. The second filter member 16c may be in a shape of a second cylinder having a second diameter $d_2$ and a second cylinder length $l_2$. The first filter member 16a may be spaced apart from the second filter member 16c. The filter housing unit 14 may be in a shape of a third cylinder having a third diameter $d_3$ corresponding to a housing unit width and a third cylinder length $l_3$ corresponding to a housing unit length. In some examples, each one of the first diameter $d_1$ of the first filter member 16a and the second diameter $d_2$ of the second filter member 16c extends across the housing unit width of the filter housing unit 14. For example, the first filter member 16a and the second filter member 16c may be perpendicular to the filter housing unit 14 such that the first diameter $d_1$ and the second diameter $d_2$ may be approximately equal to the third diameter $d_3$. In some examples, the first filter member 16a and the second filter member 16c may be transverse to the filter housing unit 14.

Figure 3A:
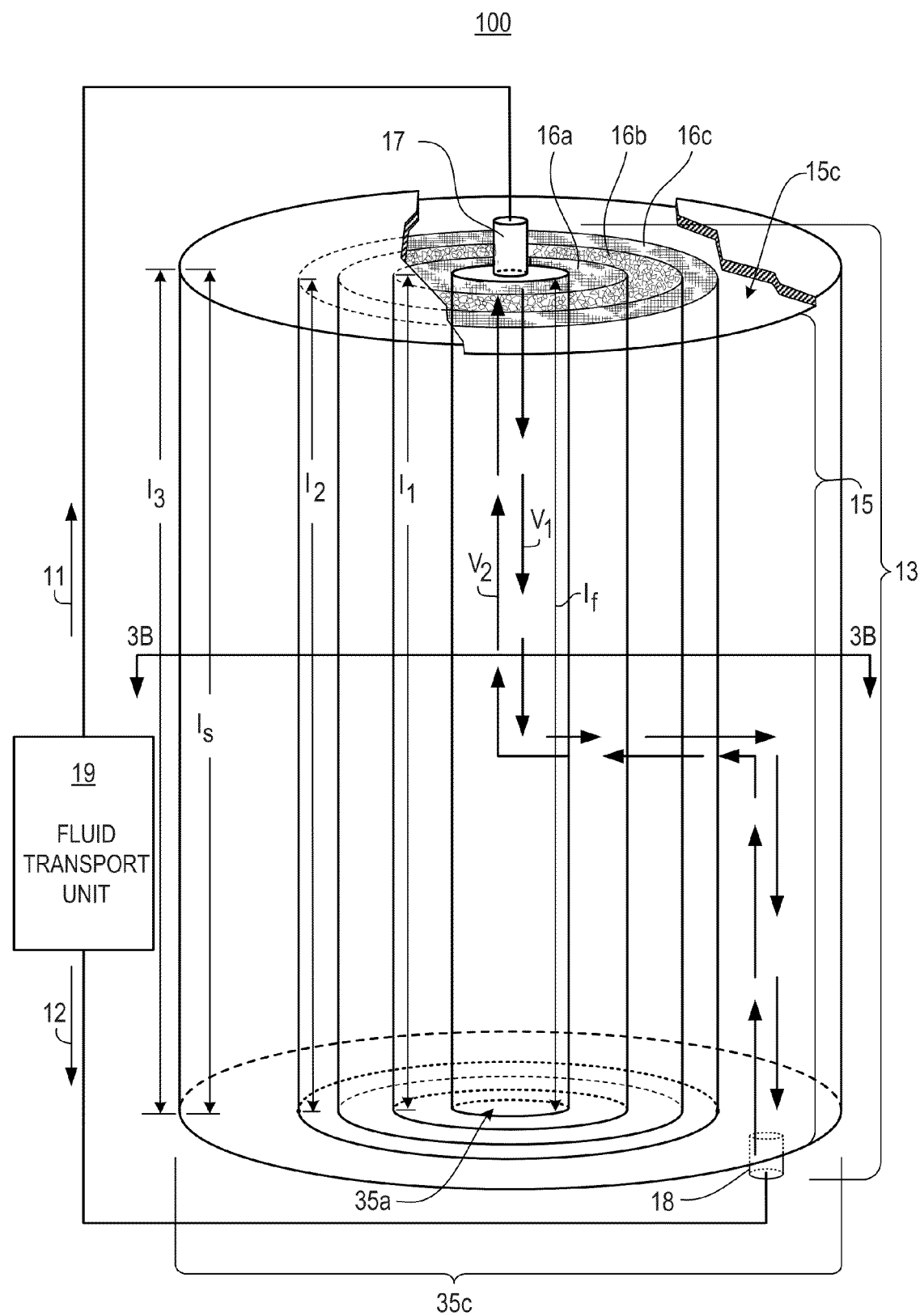
FIG. 3A is a schematic view illustrating a fluid unit of the fluid filtration system of FIG. 1 according to an example.
Figure 3B:
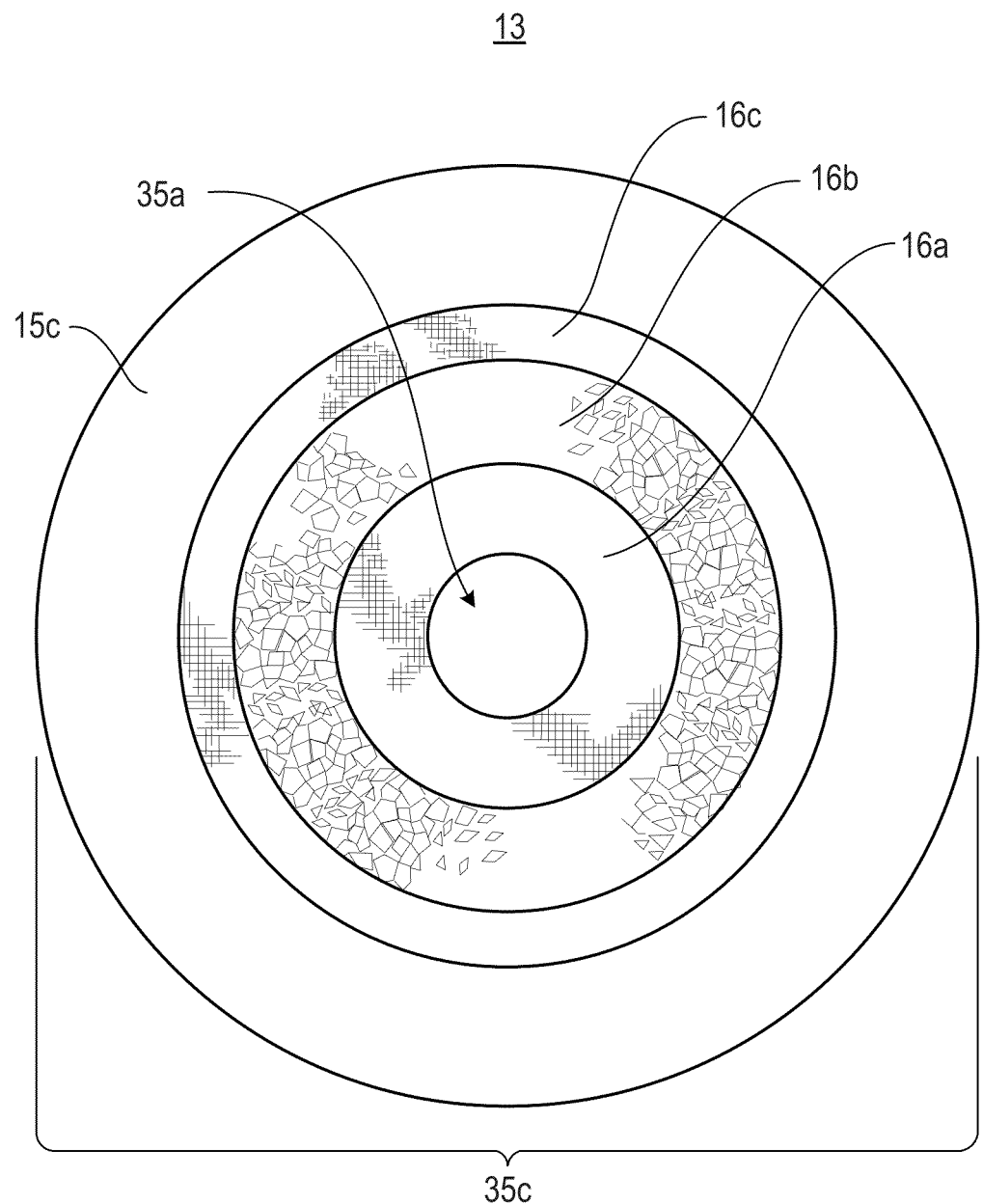
FIG. 3B is a cross-sectional view taken along line 3B-3B of the filter unit illustrating the fluid filtration system of FIG. 3A according to an example.

FIG. 3A is a schematic view illustrating a fluid unit of the fluid filtration system of FIG. 1 according to an example. FIG. 3B is a cross-sectional view taken along line 3B-3B of the filter unit of the fluid filtration system of FIG. 3A according to an example. Referring to FIGS. 3A and 3B, in some examples, the first filter member 16a may include a first opening 35a having a first opening length $l_f$ corresponding to the first cylinder length $l_1$. The second filter member 16c may also include a second opening 35c having a second opening length $l_s$ corresponding to the second cylinder length $l_2$. The filter unit 13 may also include a first pressure equalization region 35a disposed between the first filter member 16a and the first port 17 in a form of the first opening 35a of the first filter member 16a. The filter unit 13 may also include a second pressure equalization region 15c disposed between the second filter member 16c and the second port 18. The first pressure equalization region 15a and the second pressure equalization region 15c may equalize pressure therein to evenly disperse fluid through the porous adsorbent material 16b.

In some examples, a longitudinal axis of the first opening 35a and the first filter member 16a may be in parallel with each other and a longitudinal axis of the second opening 35c and the second filter member 16c may be in parallel with each other. The first filter member 16a may be disposed within the second opening 35c of the second filter member 16c. In some examples, the first filter member 16a and the second filter member 16c may be concentrically arranged such that each one of the first filter member 16a, the first opening 35a, the second filter member 16c, and the second opening 35c share a same longitudinal axis.

Referring to FIGS. 3A and 3B, in operation, in the first directional mode 11, fluid is transported by the fluid transport unit 19 to the first port 17, through the filtration media 16a, 16b and 16c and subsequently exits out the second port 18 as previously disclosed with reference to FIG. 2A. In operation, in the first directional mode 11, fluid may be transported by the fluid transport unit 19 to the first port 17, through the filtration media 16a, 16b and 16c, and subsequently exits out the second port 18 as previously disclosed with reference to FIG. 2A. In the second directional mode 12, fluid may be transported by the fluid transport unit 19 to the second port 18, through the filtration media 16a, 16b and 16c, and subsequently exits out the first port 17 as previously disclosed with reference to FIG. 2A.

Figure 4A:
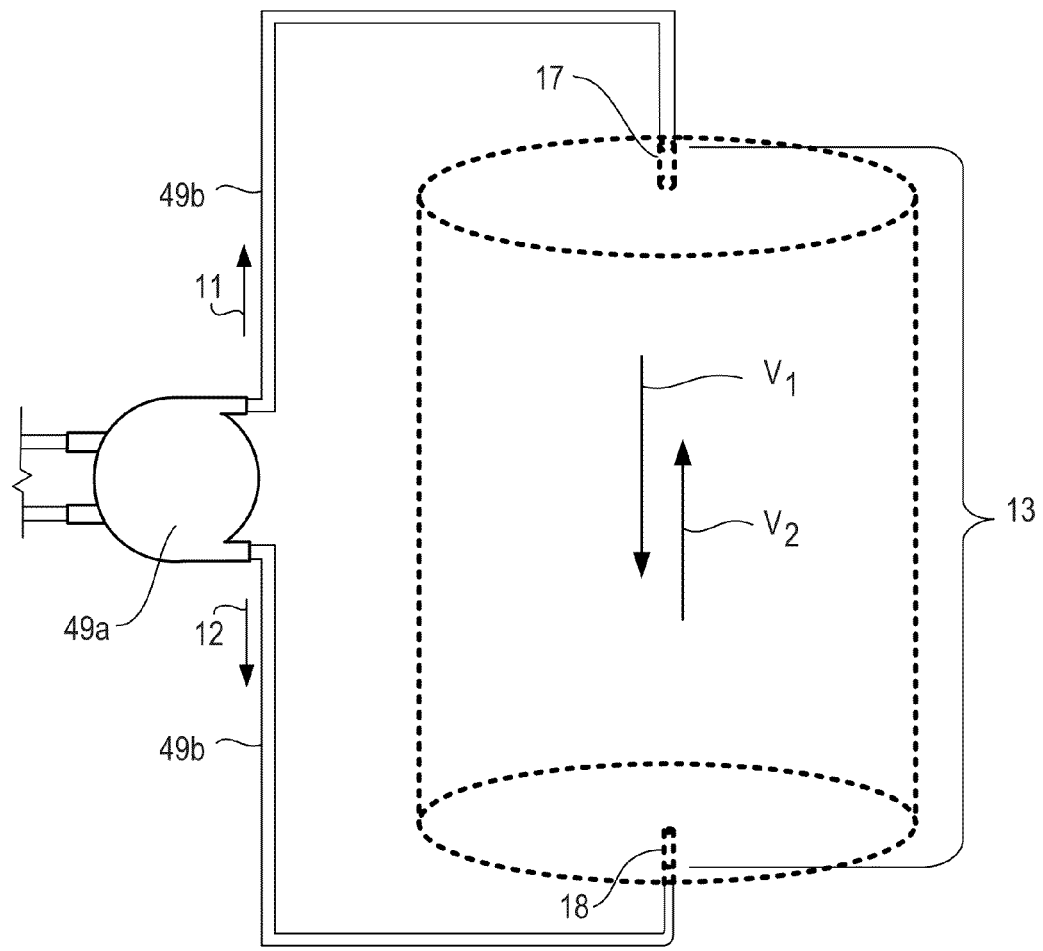
FIGS. 4A and 4B are schematic views of a fluid transport unit coupled to a filter unit of the fluid filtration system of FIG. 1 according to examples.

FIG. 4A is a schematic view of a fluid transport unit coupled to a filter unit of the fluid filtration system of FIG. 1 according to an example. Referring to FIG. 4A, in some examples, the fluid transport unit 19 transports the fluid to and from the filter unit 13. For example, the fluid transport unit 19 may include a reversible flow pump 49a and fluid transport paths 49b. The reversible flow pump 49a may direct the fluid to the first port 17, and subsequently from the second port 18 in the first directional mode 11. That is, in the first directional mode 11, the reversible flow pump 49a may receive fluid to be filtered and supply the fluid the first port 17 to establish the first flow pattern 24 (FIG. 2B) in at least the first direction $V_1$ through the filtration media. Subsequently, the reversible flow pump 49a may receive the fluid filtered by the filtration media from the second port 18 to be reused. The fluid transport paths 49b may transport the fluid to and from the filter unit 13.

Referring to FIG. 4A, in the second directional mode 12, the reversible flow pump 49a may direct the fluid to the second port 18 and subsequently from the first port 17 in the second directional mode 12. That is, in the second directional mode 12, the reversible flow pump 49a may receive fluid to be filtered and supply the fluid the second port 18 to establish the second flow pattern 25 (FIG. 2C) in at least a second direction $V_2$ through the filtration media. Subsequently, the reversible flow pump 49a may receive the fluid filtered by the filtration media from the first port 17 to be reused. The fluid transport paths 49b may transport the fluid to and from the filter unit 13.

Figure 4B:
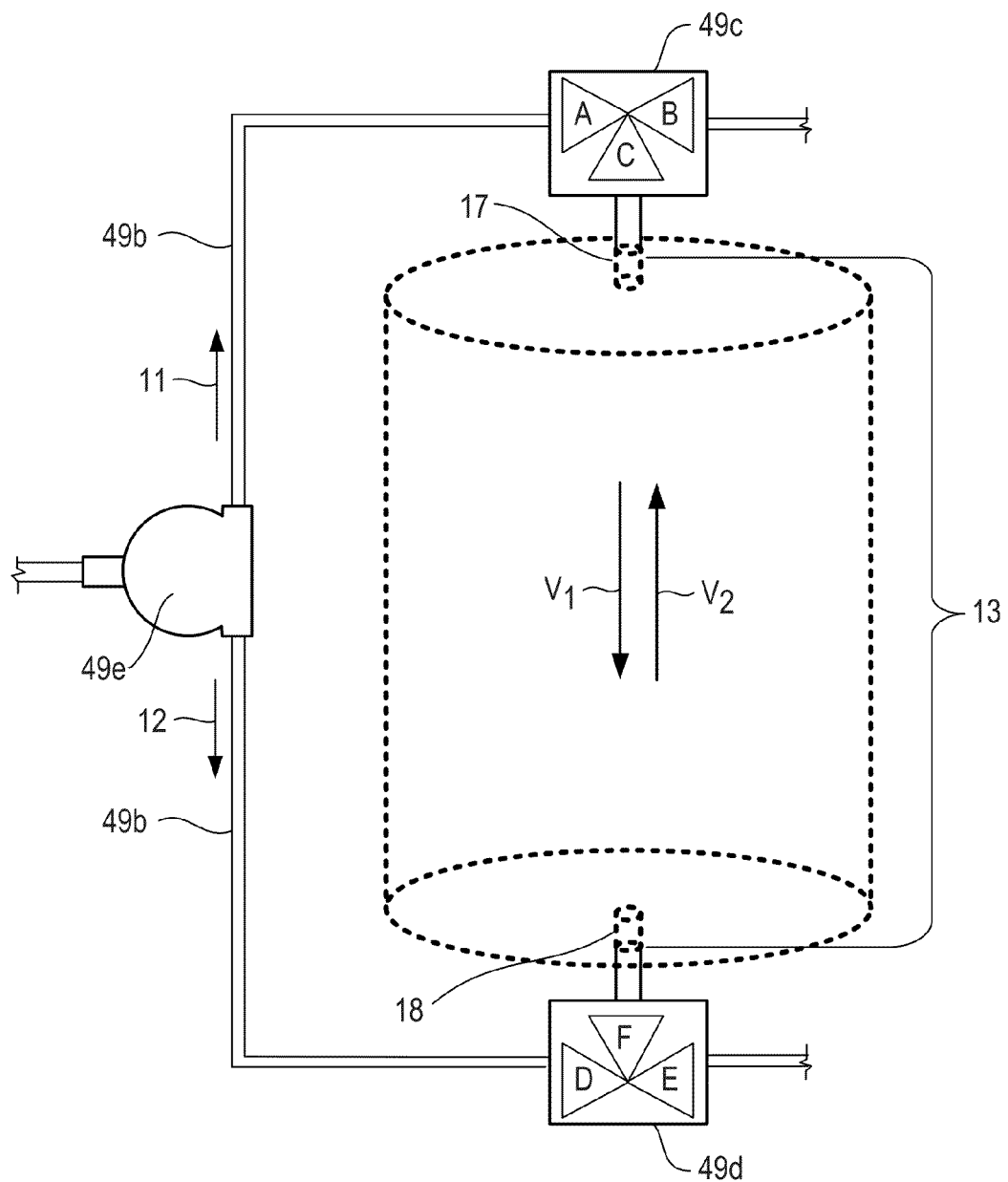

FIG. 4B is a schematic view of a fluid transport unit coupled to a filter unit of the fluid filtration system of FIG. 1 according to an example. Referring to FIG. 4B, in some examples, the fluid transport unit 19 may include a first switching valve 49c, a second switching valve 49d, a pump 49e and fluid transport paths 49b. The first switching valve 49c may direct the fluid to the first port 17 in the first directional mode 11. The first switching valve 49c may direct the fluid from the first port 17 in the second directional mode 12. The second switching valve 49d may direct the fluid to the second port 18 in the second directional mode 12. The second switching valve 49d may direct the fluid from the second port 18 in the first directional mode 11. The pump 49e may direct the fluid to the first switching valve 49c in the first directional mode 11 and to the second switching valve 49d in the second directional mode 12.

In operation, in the first directional mode 11, the pump 49e may receive fluid to be filtered and supply the fluid through first switching valve 49c to the first port 17 to establish the first flow pattern 24 (FIG. 2B) in at least the first direction $V_1$ through the filtration media. The first and second switching valves 49c and 49d may simultaneously switch into the appropriate port directional mode. That is, the first switching valve 49c is placed in a mode to direct fluid received in port A from the pump 49e to port C thereof. Subsequently, the fluid filtered by the filtration media may pass through the second switching valve 49d from the second port 18 to be reused. That is, the second switching valve 49d is placed in a mode to direct fluid received in port F from the second port 18 to port E thereof. The fluid transport paths 49b may transport the fluid to and from the filter unit 13.

In operation, in the second directional mode 12, the pump 49e may receive fluid to be filtered and supply the fluid through the second switching valve 49d to the second port 18 to establish the second flow pattern 25 (FIG. 2C) in at least the second direction $V_2$ through the filtration media. The first and second switching valves 49c and 49d may simultaneously switch into the appropriate port directional mode. That is, the second switching valve 49d is placed in a mode to direct fluid received in port D from the pump 49f to port F thereof. Subsequently, the fluid filtered by the filtration media may pass through the first switching valve 49c from the first port 17 to be reused. That is, the first switching valve 49d is placed in a mode to direct fluid received in port C from the first port 17 to port B thereof. The fluid transport paths 49b may transport the fluid to and from the filter unit 13.

Figure 5:
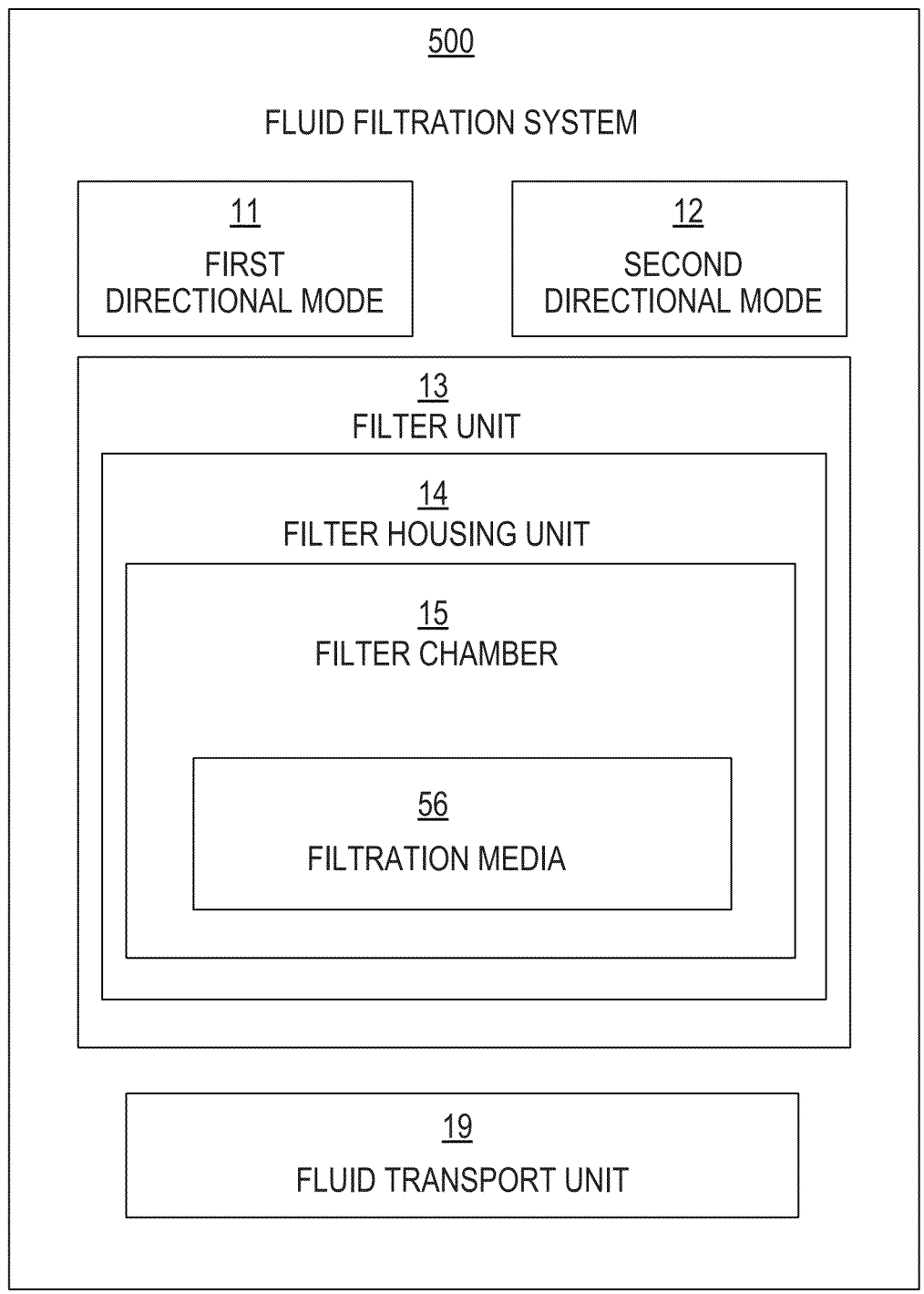
FIG. 5 is a block diagram illustrating a fluid filtration system usable with an image forming apparatus according to an example.
Figure 6A:
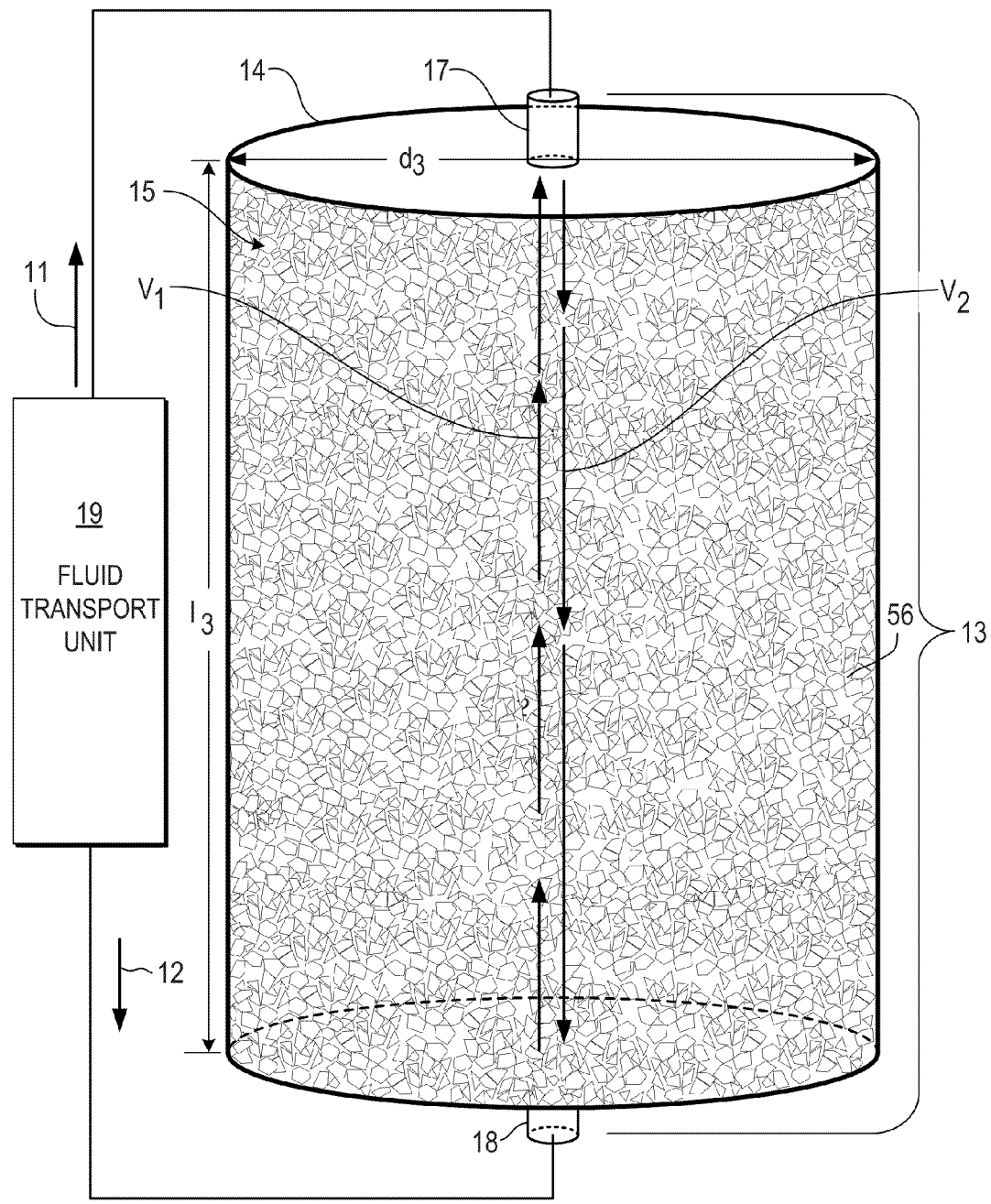
FIG. 6A is a schematic view illustrating the fluid filtration system of FIG. 5 according to an example.
Figure 6B:
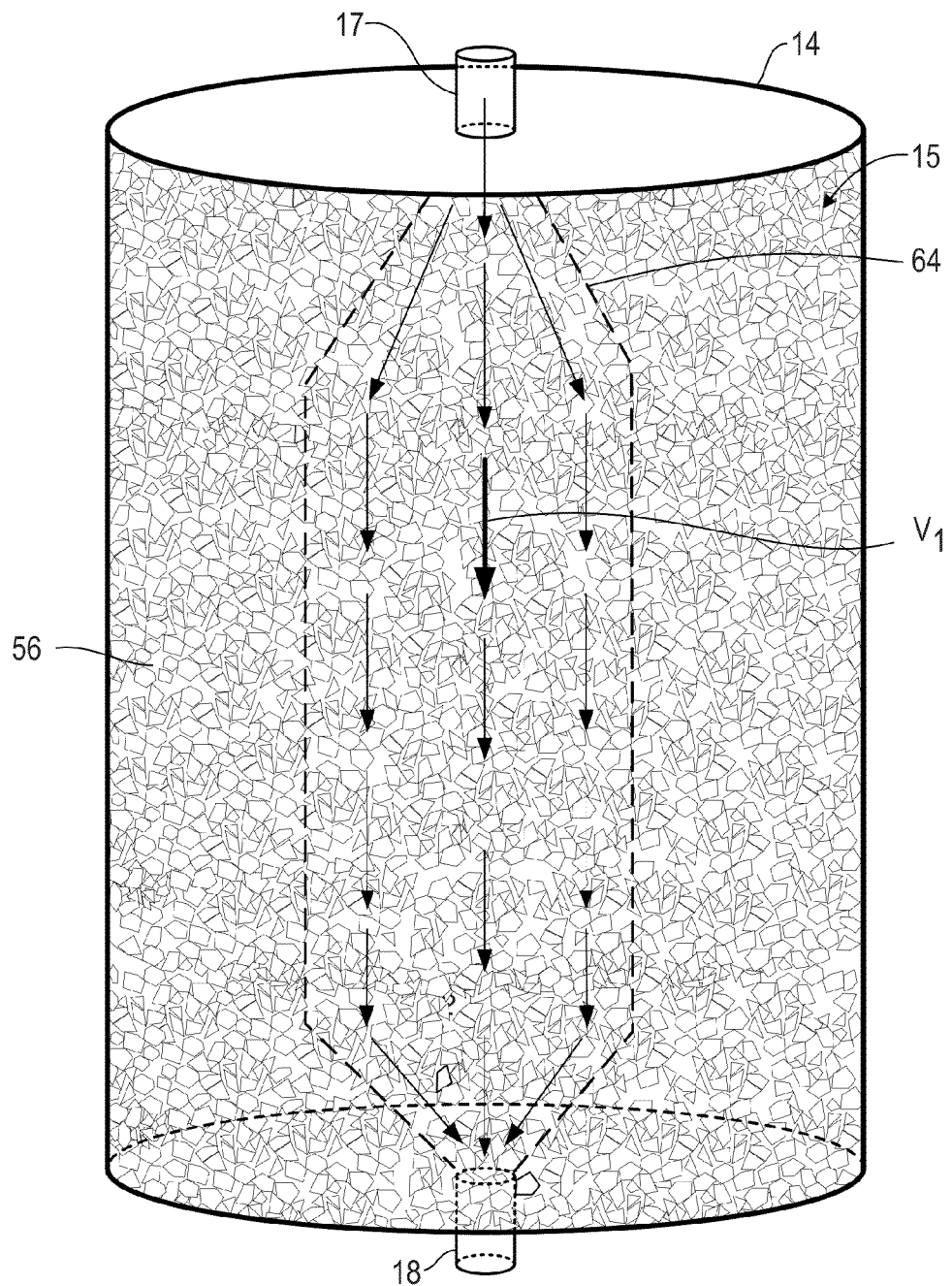
FIGS. 6B and 6C are exploded views of a filter unit of the fluid filtration system of FIG. 6A illustrating a first flow pattern and a second flow pattern, respectively, according to examples.
Figure 6C:
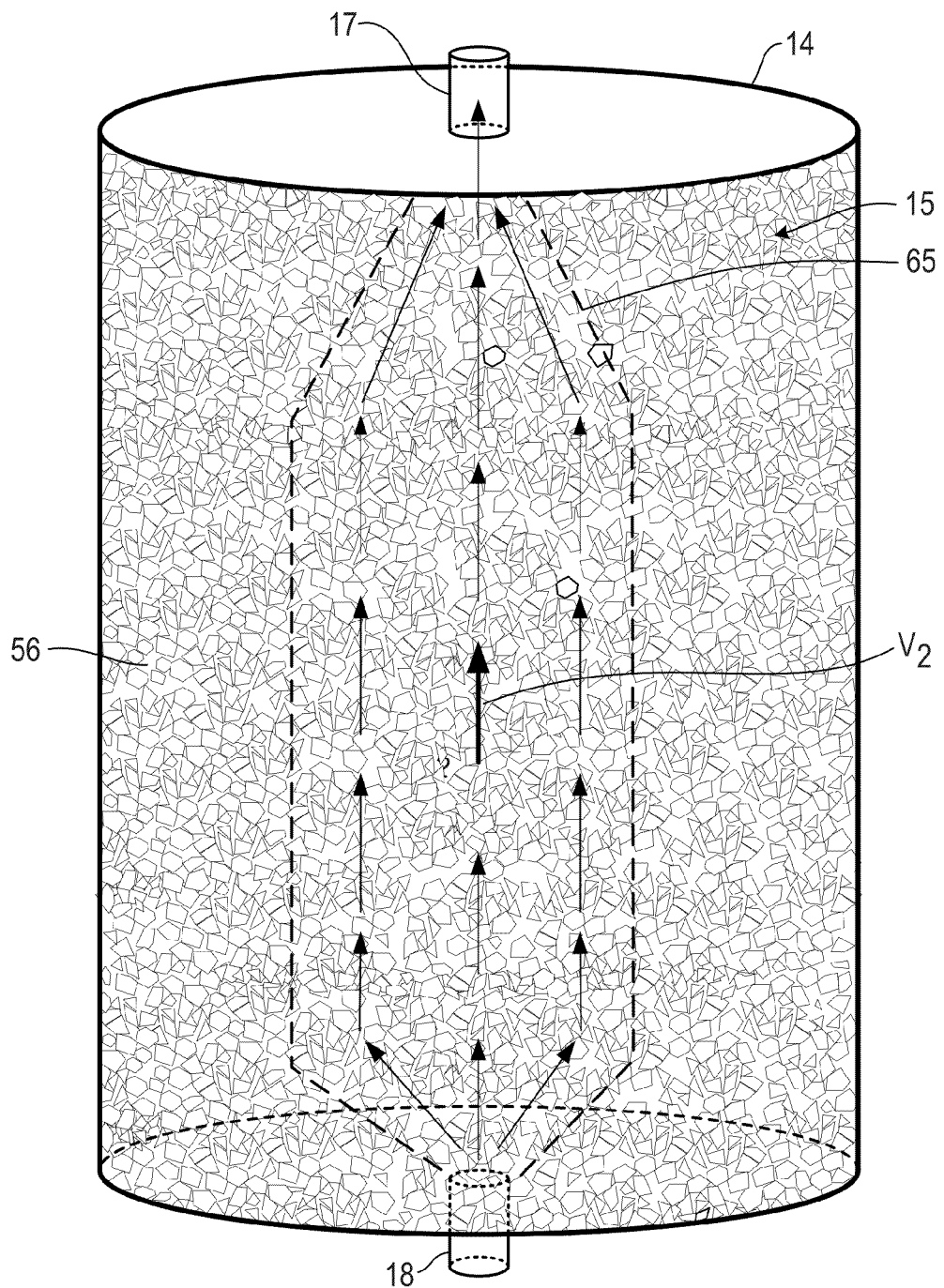
Figure 7:
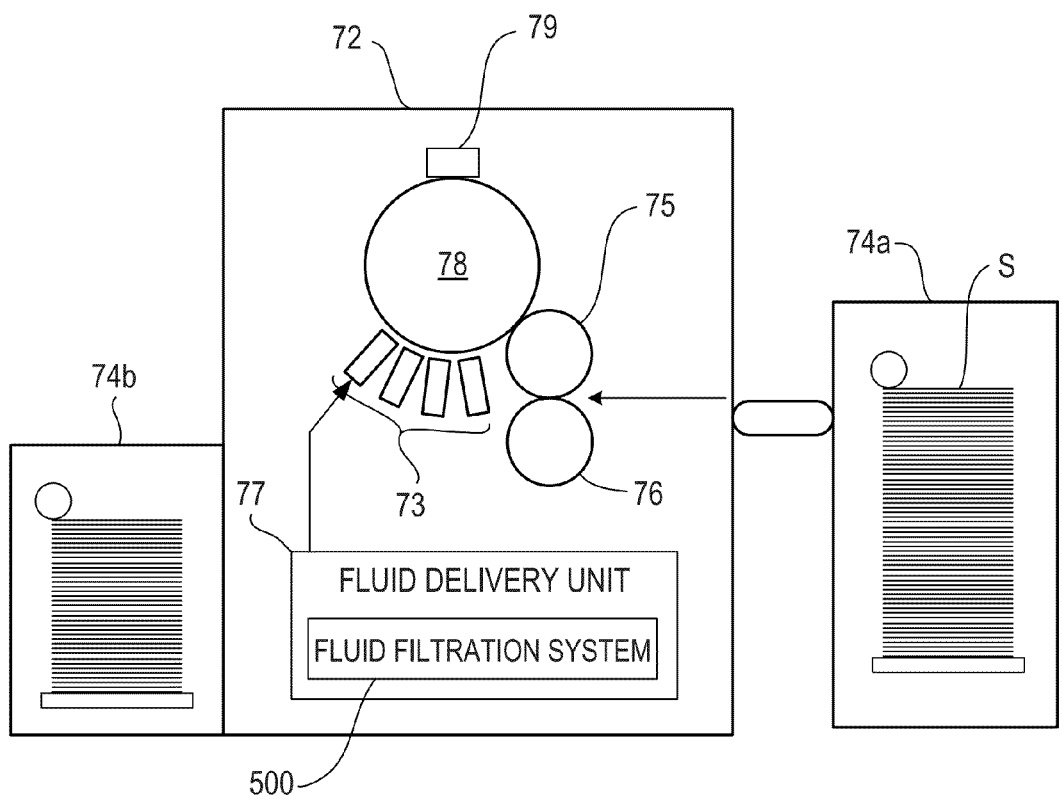
FIG. 7 is a schematic view illustrating an image forming apparatus such as a liquid electrophotography printing apparatus including the fluid filtration system of FIG. 5 according to an example.

FIG. 5 is a block diagram illustrating a fluid filtration system usable with an image forming apparatus according to an example. FIG. 6A is a schematic view illustrating the fluid filtration system of FIG. 5 according to an example. FIGS. 6B and 6C are exploded views of a filter unit of the fluid filtration system of FIG. 6A illustrating a first flow pattern and a second flow pattern, respectively, according to examples. The fluid filtration system 500 having a first directional mode 11 and a second directional mode 12 may be usable with an image forming apparatus 701 (FIG. 7). Referring to FIGS. 5-6C, in some examples, the fluid filtration system 500 may include a filter unit 13 and a fluid transport unit 19. The filter unit 13 includes a filter housing unit 14 and a filter chamber 15 disposed in the filter unit 13. The filter chamber 15 includes filtration media 56 stored therein to filter carrier oil transported therethrough in a first flow pattern 64 in at least a first direction $V_1$ in the first directional mode 11 and in a second flow pattern 65 in at least a second direction $V_2$ in the second directional mode 12.

Referring to FIGS. 5-6C, in some examples, the fluid transport unit 19 may selectively direct the carrier oil to the filter housing unit 14 to establish the first flow pattern 64 in the at least first direction $V_1$ in the first directional mode 11 through the filtration media 56. The fluid transport unit 19 may also selectively direct the carrier oil to the filter housing unit 14 to establish the second flow pattern 65 in the at least second direction $V_2$ in the second directional mode 12 through the filtration media 56. The at least first direction $V_1$ is different than the at least second direction $V_2$.

Referring to FIG. 6A, in some examples, the fluid unit 13 may also include a first port 17 and a second port 18. In the first directional mode 11, the first port 17 receives the carrier oil and subsequently the second port 17 outputs the carrier oil in the first directional mode 11. In the second directional mode 12, the second port 18 receives the carrier oil and the first port 17 subsequently outputs the carrier oil. In some examples, the first port 17 may be proximate to one side of the filtration media 56 and the second port 18 may be opposite to an other side of the filtration media 56. For example, the other side of the filtration media 56 may correspond to a side opposite the one side of the filtration media 56. In some examples, the first and second ports 17 and 18 may include screening members (not illustrated) to prevent the filtration media 56 from flowing out of the fluid chamber 15 while allowing fluid to pass therethrough.

In some examples, the filtration media 56 may include a porous adsorbent material 16b, for example, in a form of a bed of porous absorbent crystals of various sizes and shapes. In some examples, the filtration media 56 may include a first filter member 16a, a second filter member 16c and a porous adsorbent material 16b as previously disclosed with respect to FIGS. 1 to 3B. The first filter member 16a and the second filter member 16c may be spaced apart from each other. The first filter member 16a may receive the carrier oil before the second filter member 16c in the first directional mode 11. The second filter member 16c may receive the carrier oil before the first filter member 16a in the second directional mode 12. The porous adsorbent material 16b may be disposed between the first filter member 16a and the second filter member 16c.

In operation, in the first directional mode 11, fluid is transported by the fluid transport unit 19 to the first port 17 of the filter unit 13 to establish the first flow pattern 64 in at least a first direction $V_1$ through the filtration media in the fluid chamber 15. That is, the fluid sequentially passes through the first port 17, the filtration media 56, and exits out the second port 18. In the second directional mode 12, fluid is transported by the fluid transport unit 19 to the second port 18 of the filter unit 13 to establish the second flow pattern 65 in at least the second direction $V_2$ through the filtration media in the fluid chamber 15. That is, the fluid sequentially passes through the second port 18, the second filter member 16c, the filtration media 56, and exits out the first port 17. Alternating between the first directional mode 11 and the second directional mode 12 to change the respective direction of the flow of the fluid in the filtration media 56 may maintain a rate and capacity of the filtration media 56 to filter the fluid passing therethrough.

FIG. 7 is a schematic view illustrating an image forming apparatus such as a liquid electrophotography printing apparatus including the fluid filtration system of FIG. 5 according to an example. FIG. 7 is a schematic view illustrating an image forming apparatus such as a liquid electrophotography printing apparatus according to an example. Referring to FIG. 7, in some examples, the liquid electrophotography printing apparatus (LEP) 701 may include an image forming unit 72, an input unit 74*a* and an output unit 74*b*. The image forming unit 72 may receive a media S from the input unit 74*a* and output the media S to the output unit 74*b*. The image forming unit 72 may include a photo imaging member (PIP) 78 and a fluid delivery unit 77. The photo imaging member (PIP) 78 includes an outer surface on which images can be formed. The outer surface may be charged with a suitable charger (not illustrated), such as a charge roller, and portions of the outer surface that correspond to features of the image can be selectively discharged by a laser writing unit 79 to form an electrostatic image on the outer surface.

Referring to FIG. 7, in some examples, the fluid delivery system 77 may supply fluid such as liquid toner, for example, ElectroInk, trademarked by Hewlett-Packard Company, having carrier oil mixed therein to fluid development units of the LEP 701 such as BIDs 73. The fluid delivery unit 77 may also include a fluid filtration system 500 (FIG. 5) to filter and reuse the carrier oil. The BIDs 73 apply the fluid to the electrostatic image to form a fluid image on the outer surface of the PIP 78 to be transferred to an intermediate transfer member (ITM) 75. The ITM 75 may receive the fluid image from the PIP 78, heat the image, and transfer the image to the media S. During the transfer from the ITM 75 to the media S, the media S is pinched between the ITM 75 and an impression member 79. Thus, the fluid image may be transferred to the media S which may be transported to the output unit 74*b*.

Figure 8:
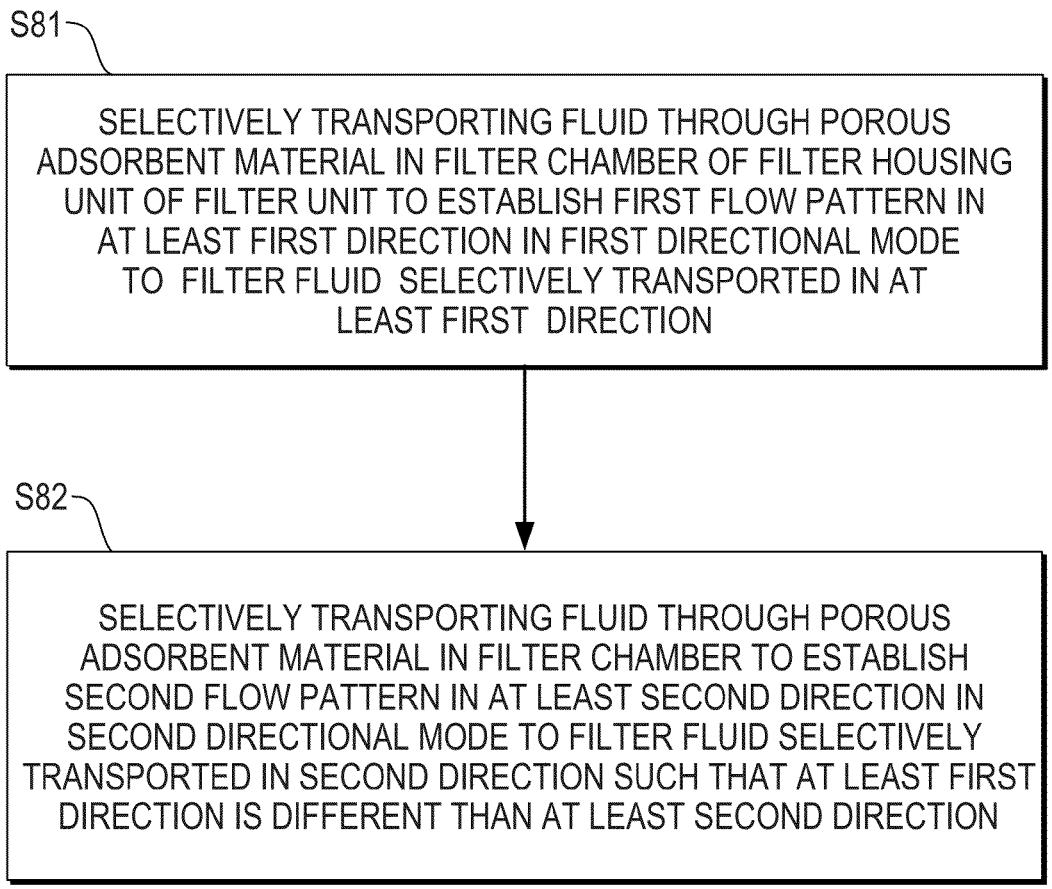
FIG. 8 is a flowchart illustrating a method of filtering fluid in a first directional mode and in a second directional mode according to an example.

FIG. 8 is a flowchart illustrating a method of filtering fluid in a first directional mode and in a second directional mode according to an example. Referring to FIG. 8, in block S81, fluid is selectively transported through porous adsorbent material in a filter chamber of a filter housing unit of a filter unit to establish a first flow pattern in at least a first direction in the first directional mode to filter the fluid selectively transported in the at least first direction. For example, the fluid may be transported through a first filter member, through the porous adsorbent material, and subsequently through a second filter member in the first directional mode.

In block S82, fluid is selectively transported through the porous adsorbent material in the filter chamber to establish a second flow pattern in at least a second direction in the second directional mode to filter the fluid selectively transported in the second direction. The at least first direction is different than the at least second direction. For example, the fluid may be transported through the second filter member, through the porous adsorbent material, and subsequently through the first filter member in the second directional mode. The porous adsorbent material is disposed between the first filter member and the second filter member.

In some examples, the method may also include selective transportation of the fluid to a first port of the filter unit and subsequently from a second port of the filter unit in the first directional mode. For example, the fluid may be transported through a reversible flow pump to the first port and from the second port in the first directional mode. The method may also include selective transportation of the fluid to the second port and subsequently from the first port in the second directional mode. For example, the fluid may be selectively transported through the reversible flow pump to the second port and from the first port in the second directional mode. In some examples, the fluid includes carrier oil.

In some examples, the method may also include transportation of the fluid through a first switching valve to the first port of the filter housing unit in the first directional mode and from the first port in the second directional mode. The method may also include transportation of the fluid through a second switching valve to the second port of the filter housing unit in the second directional mode and from the second port in the first direction. The method may also include transportation of the fluid through a pump to the first switching valve in the first directional mode and to the second switching valve in the second directional mode.

It is to be understood that the flowchart of FIG. 8 illustrates an architecture, functionality, and operation of an example of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 8 illustrates a specific order of execution, the order of execution may differ from that which is depicted. For example, the order of execution of two or more blocks may be scrambled relative to the order illustrated. Also, two or more blocks illustrated in succession in FIG. 8 may be executed concurrently or with partial concurrence. All such variations are within the scope of the present disclosure.

The present disclosure has been described using non-limiting detailed descriptions of examples thereof that are not intended to limit the scope of the present disclosure. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the present disclosure and which are described for illustrative purposes. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method of filtering fluid in a first directional mode and in a second directional mode, the method comprising:
   selectively transporting fluid through porous adsorbent material in a filter chamber of a filter housing unit of a filter unit to establish a first flow pattern in at least a first direction in the first directional mode to filter the fluid selectively transported in the at least first direction;
   selectively transporting fluid through the porous adsorbent material in the filter chamber to establish a second flow pattern in at least a second direction in the second directional mode to filter the fluid selectively transported in the second direction such that the at least first direction is different than the at least second direction;
   selectively transporting fluid to a first port of the filter unit and subsequently from a second port of the filter unit in the first directional mode; and
   selectively transporting fluid to the second port and subsequently from the first port in the second directional mode such that the fluid includes carrier oil.

2. The method according to claim 1, wherein:
the selectively transporting the fluid to the first port of the filter unit and subsequently from a second port of the filter unit in the first directional mode further comprises transporting the fluid through a reversible flow pump to the first port and from the second port in the first directional mode; and wherein:
the selectively transporting the fluid to the second port and subsequently from the first port in the second directional mode further comprises transporting the fluid through the reversible flow pump to the second port and from the first port in the second directional mode.

* * * * *